E. B. & C. B. WILBUR.
FEEDING MECHANISM FOR TYPE WRITING MACHINES.
APPLICATION FILED FEB. 6, 1915.

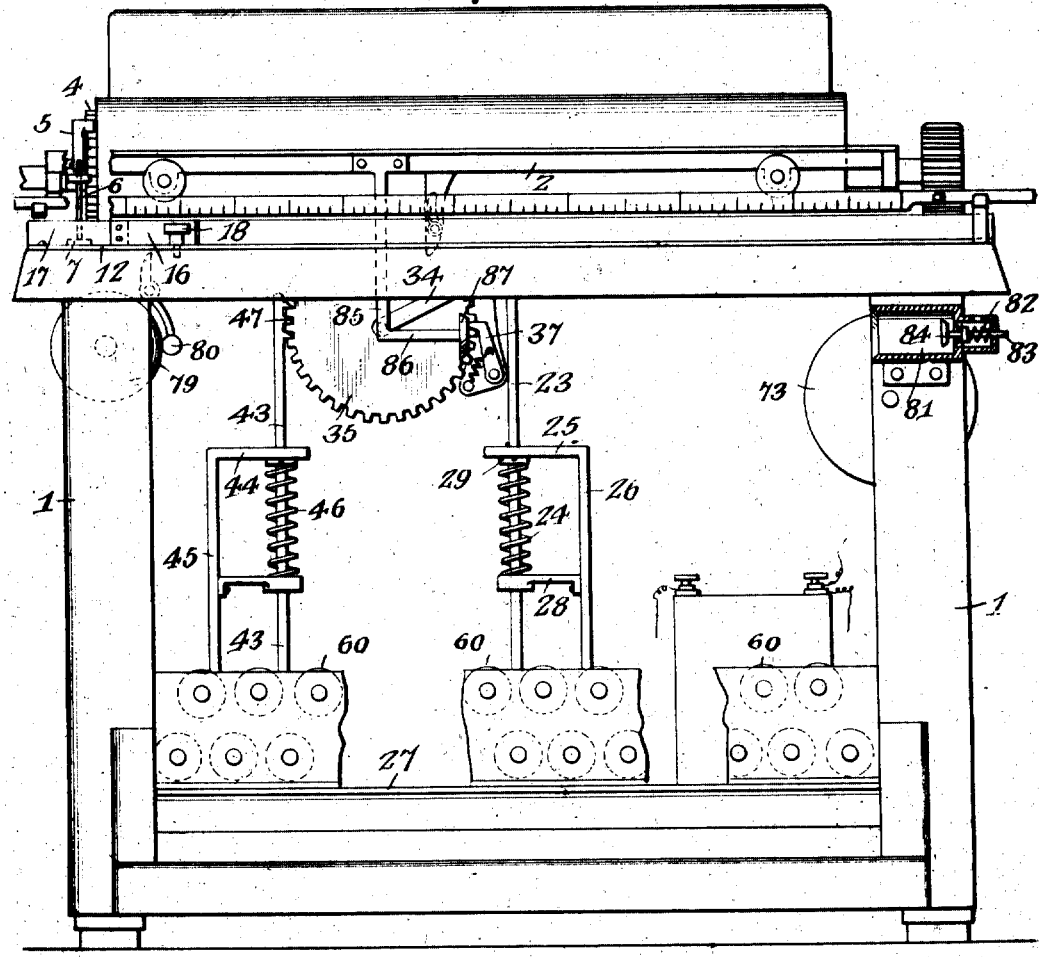
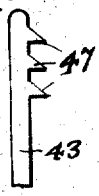
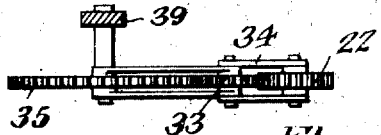
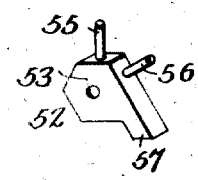

1,233,532.

Patented July 17, 1917.
5 SHEETS—SHEET 2.

Elmer B. Wilbur, Inventors
Charles B. Wilbur

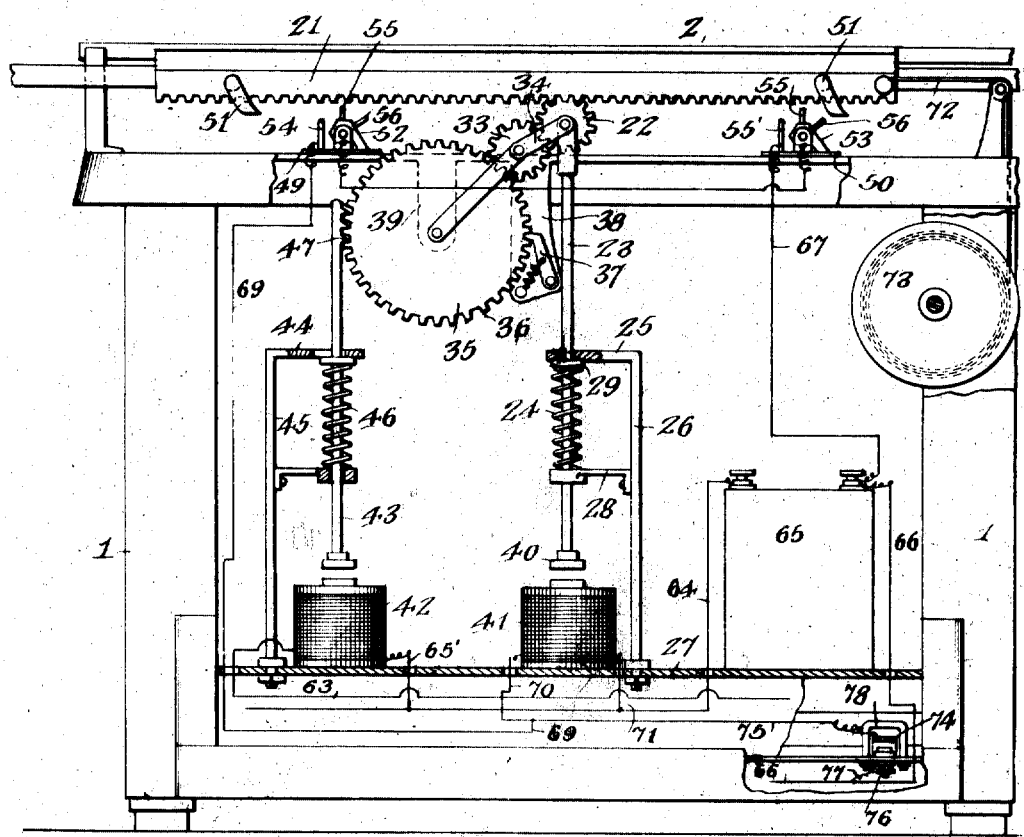
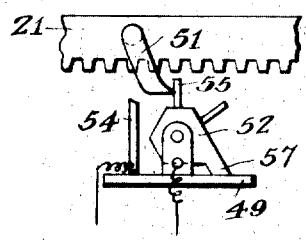
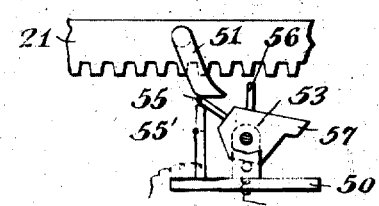

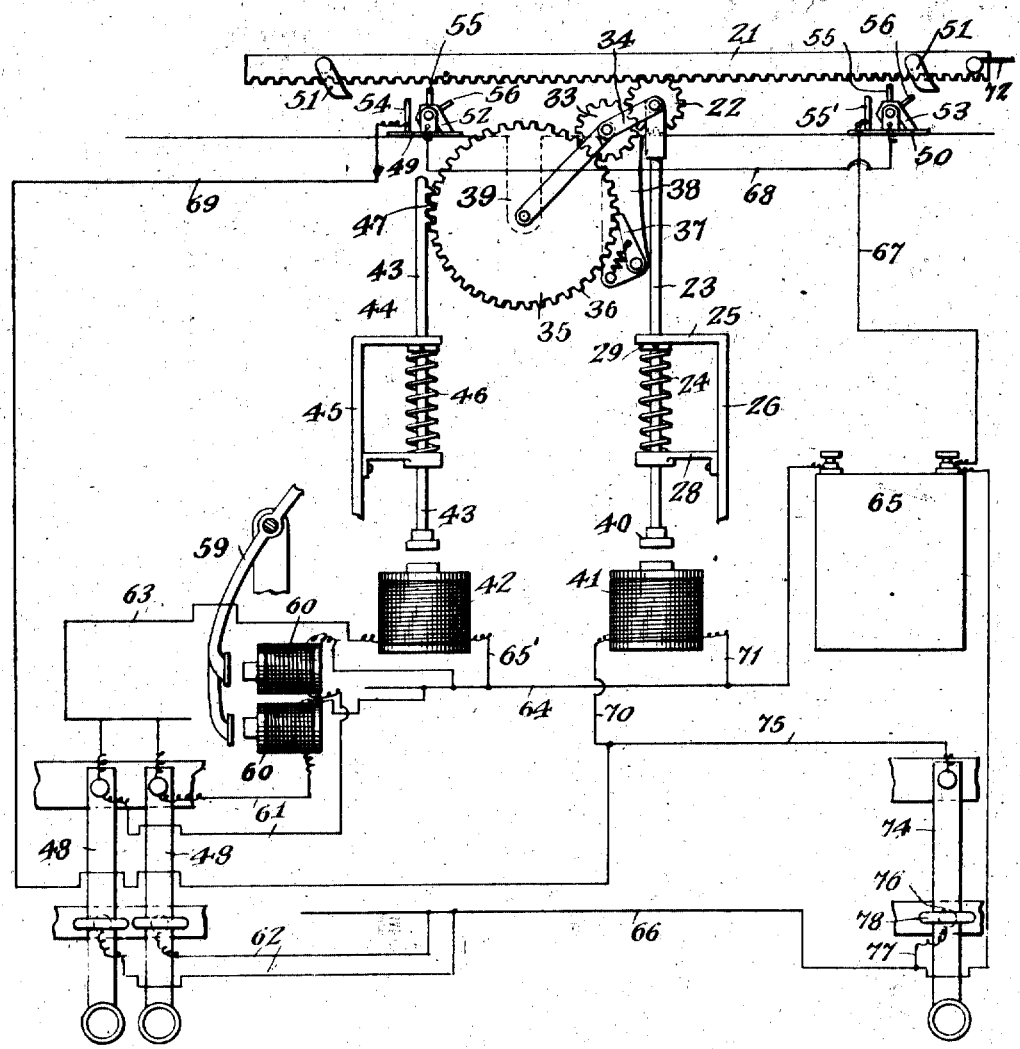

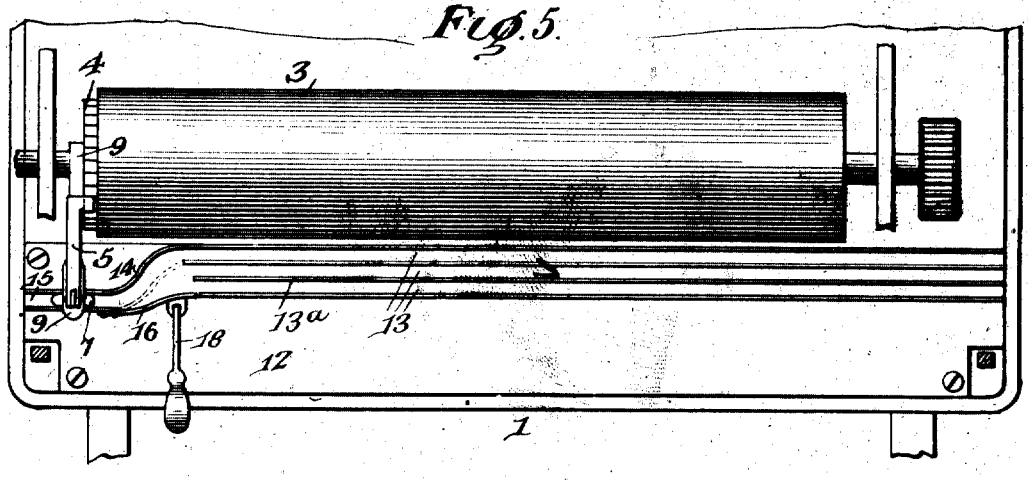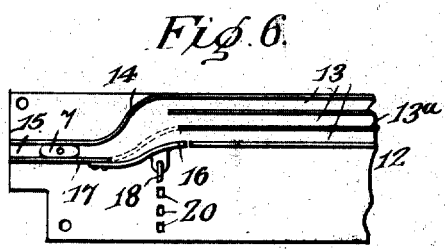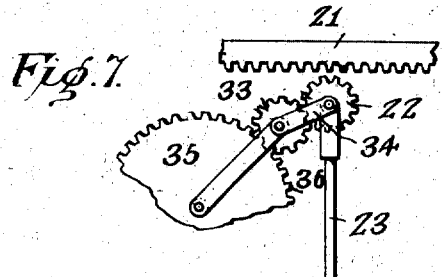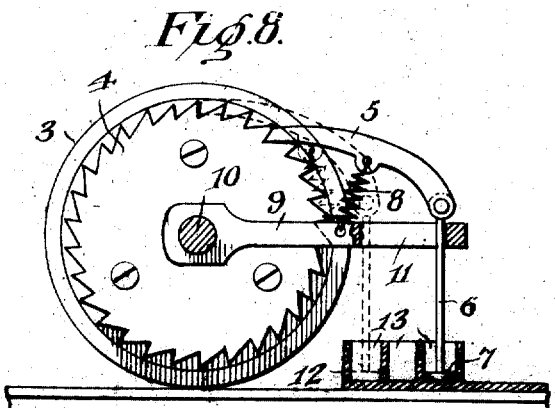

UNITED STATES PATENT OFFICE.

ELMER B. WILBUR AND CHARLES B. WILBUR, OF SHENANDOAH, IOWA.

FEEDING MECHANISM FOR TYPE-WRITING MACHINES.

1,233,532.  Specification of Letters Patent.  Patented July 17, 1917.

Application filed February 6, 1915. Serial No. 6,520.

*To all whom it may concern:*

Be it known that we, ELMER B. WILBUR and CHARLES B. WILBUR, citizens of the United States of America, residing at Shenandoah, in the county of Page, and State of Iowa, have invented certain new and useful Improvements in a Feeding Mechanism for Type-Writing Machines, of which the following is a specification, reference being had therein to the accompanying drawing.

This invention relates to a feeding mechanism for typewriting machines, and has for its object the production of a simple and efficient means for automatically returning the carriage of a typewriting machine after the same has reached its limit of movement in one direction.

A still further object of this invention is the production of a simple and efficient means whereby the return of the carriage may be accomplished in a very efficient manner.

With these and other objects in view this invention consists of certain novel combinations, constructions, and arrangements of parts as will be hereinafter fully described and claimed.

In the accompanying drawings:—

Figure 1 is a front elevation of the frame of the typewriting machine, certain parts thereof having been removed for the purpose of conveniently illustrating the important features of the present invention.

Fig. 3 is a rear elevation of the typewriting machine, certain parts thereof being broken away for the purpose of conveniently showing the operating magnets for controlling the operation of the carriage.

Fig. 4 is a diagrammatic view of the electrical circuits used in connection with the present carriage return mechanism shown with a rear elevation of the carriage-operating mechanism.

Fig. 5 is a top plan view of the carriage, certain parts thereof being removed showing the construction of the line spacing mechanism in top plan.

Fig. 6 is a top plan view of the track adapted to coöperate with the line spacing mechanism.

Fig. 7 is a vertical section through the support, and portion of the supporting bracket which is adapted to coöperate with the pinion carrying plunger arm for controlling the return of the carriage of the machine.

Fig. 8 is an enlarged end view of one end of the platen roller showing a portion of the line spacing track in cross section.

Fig. 9 is an enlarged front elevation of a portion of the rack adapted to be carried by the carriage of the machine showing the manner of operating the primary contact member.

Fig. 10 is an enlarged view similar to Fig. 9 showing the manner of operating the auxiliary contact member.

Fig. 11 is a top plan view of the pinion mechanism adapted to engage the rack carried by the carriage of the machine showing the supporting bracket thereof or hanger in section.

Fig. 12 is a detail perspective of one of the tripping contact members adapted to be tripped by means of the depending lugs supported upon the rack carried by the carriage of the machine.

Fig. 14 is an enlarged view of the upper end of the plunger rod which is adapted to feed the carriage in one direction, showing the construction of the feeding path formed upon this feeding plunger rod.

Figure 2:
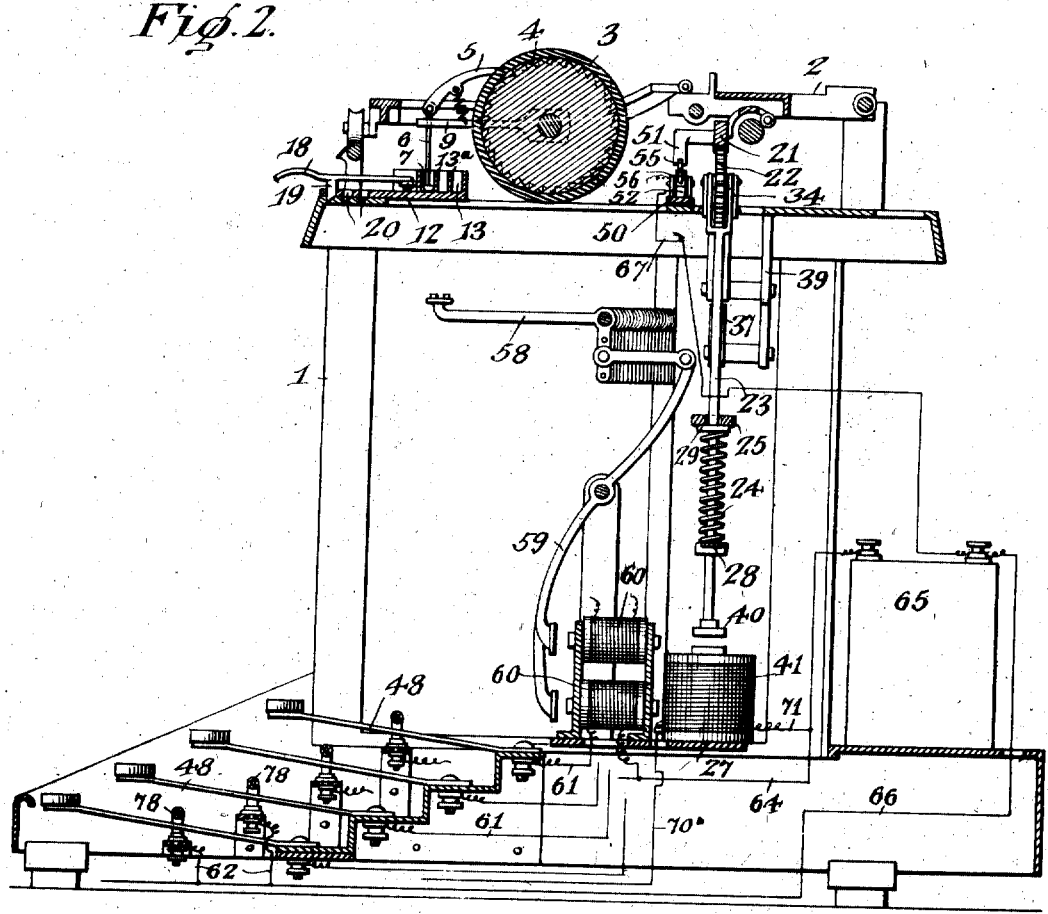
Fig. 2 is a central vertical section through the typewriting machine showing the operating keys formed thereon, and also showing the rack releasing mechanism for permitting the carriage to be returned to its normal position.
Figure 13:
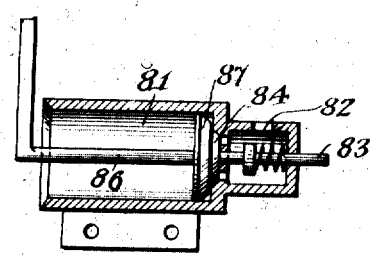
Fig. 13 is an enlarged longitudinal section through the shock absorber for relieving the shock of the carriage upon its return movement.

By referring to the drawings it will be seen that 1 designates the frame of the typewriting machine which may be formed of any suitable or desired construction, and it might be stated in advance of the following description that the present device is capable of being used with what may be known as a blind machine or a visible writing machine without departing from the spirit of the invention, as the principal purpose of the illustration in the accompanying drawings is to show the operation and construction of the several parts for accomplishing the desired result as will be more fully hereinafter described.

The frame 1 carries the movable carriage 2 upon the top thereof, which carriage supports the usual platen roller 3. This roller 3 is, of course, provided at one end with the ratchet wheel 4 having a plurality of teeth formed upon the periphery thereof for engaging the spacing dog 5. This spacing dog 5 is secured at one end to a depending rod 6 having a shoe 7 formed upon the lower end thereof. The dog 5 is also engaged by means of a coil spring 8, which coil spring is in turn connected to an arm 9 carried by the supporting shaft 10 of the platen roller 3. The depending rod 6 projects through an enlarged aperture 11 formed in the arm 9. as is clearly illustrated in Fig. 8 of the drawings.

The upper portion of the frame of the machine 1 carries a trackway 12 comprising a plurality of channel portions 13, which channel portions terminate at one end in a switch portion 14 clearly illustrated in Fig. 6 of the drawings. This switch portion 14 in turn terminates in a straight track portion 15, and this straight track portion 15 is adapted to be thrown into a continuous communication with one of the channels 13 by means of the spring shifting lip 16, the spring shifting lip 16 being fixedly secured to one of the flanges 17 of the straight track portion 15. The spring shifting lip 16 is connected to an operating handle 18, which operating handle 18 is in turn provided with a depending lug or tongue 19 for fitting in one of the adjusting notches 20 formed upon the upper face of the frame 1 as clearly illustrated in Figs. 2 and 6 of the drawings. By means of the mechanism shown in Fig. 6 and also in Fig. 2 it should be understood that the correct spacing for the platen roller will take place automatically upon the proper adjustment of the spring lip 16 to communicate with one of the channels or passages 13. One of the adjusted positions of the spring lip 16 is shown in dotted lines in Fig. 6 of the drawings.

It should be understood that the straight track portion 15 is formed a sufficient distance in advance of the first channel portion 13 to permit the proper spacing of the platen roller to accommodate what is now generally known as the single space. When a double space is desired the spring lip is brought up into contact with the second wall 13ª shown in dotted lines in Fig. 6. When a triple space is desired, the spring lip 16 is brought up to the position shown in dotted lines in Fig. 5, thereby regulating the automatic spacing of the platen roller without the necessity of the operator manually turning the roller to the desired position.

The carriage 2 is provided with a rack portion 21 which is fixedly secured thereto in any suitable or desired manner, and this rack portion 21 engages a primary pinion 22, which primary pinion is carried by the upper end of the plunger rod 23. The plunger rod 23 carries a coil spring 24, which coil spring engages the under face of the overhanging arm 25 of the vertically extending bracket 26, the bracket 26 being supported upon the base 27 of the machine in any suitable or desired manner without departing from the spirit of the invention. A detachable arm 28 is secured to the bracket 26 and constitutes a support for the lower end of the spring 24. The upper end of the spring 24 engages a collar 29 which is fixedly secured to the rod 23, the rod 23 loosely extending through the overhanging arm 25. An auxiliary pinion 33 is supported adjacent the primary pinion 22 and meshes therewith and is held in firm engagement with the pinion 22 by means of the links 34. The pinion 33 also meshes with an enlarged actuating gear 35, which gear 35 has teeth 36 formed upon the periphery thereof, which teeth are engaged by means of a spring pressed pawl 37 for preventing the rotation of the gear 35 in one direction. This dog or pawl 37 is supported upon a depending bracket 38 carried by the frame of the machine 1. The gear 35 is in turn supported upon a depending bracket 39 shown in dotted lines in Fig. 3 of the drawings.

It should be understood that the lower end of the plunger rod 23 carries an enlarged head 40 which is adapted to be attracted by the electro-magnet 41 supported upon the base 27 of the typewriting machine. Adjacent this magnet 41 is placed a second magnet 42, and this magnet 42 actuates the plunger rod 43, which plunger rod passes through the overhanging arm 44 of the supporting bracket 45. A spring 46 is mounted upon the plunger rod 43 and is adapted to normally hold the plunger rod 43 out of engagement with the electro-magnet 42. The bracket 45 is formed similar to the bracket 26. The plunger 43 is provided with a plurality of teeth 47 formed upon one side thereof which are beveled upon their upper faces for the purpose of permitting the plunger rod 43 to move upwardly to permit the teeth 47 upon the plunger rod 43 to efficiently engage the teeth 36 and cause the rotation of the gear 35 in the proper direction as soon as the magnet 42 is energized. By the energization of the magnet 42 it should be understood that the plunger rod 43 may be given a reciprocating motion by making and breaking the electrical circuit which controls the magnet 42, which make and break is accomplished by each operation of one of the keys 48 shown in Fig. 2 of the drawings.

A primary contact member 49 is supported upon the top of the frame 1 at one end thereof, that is to say near the left hand end of the carriage as viewed in Fig. 8, and an auxiliary contact member 50 is supported upon the opposite or right hand end thereof. The rack bar 21 carries a plurality of tripping fingers 51 near the respective ends thereof for tripping the pivotally mounted contact dogs 52 and 53 carried by the respective contact members 49 and 50. The contact 49 is provided with an integral upwardly extending contact finger 54 which is adapted to permit the closing of the circuit therewith as soon as the upwardly extending finger 55 of the contact dog 52 is swung or thrown to a contact position by means of the tripping finger 51 carried to the right of the rack bar 21. It should be understood that each of the contact members 49 and 50 is provided with an upwardly extending finger 55 and also a finger 56 extending at an angle of approximately 45° thereto to permit the contact dogs 52 and 53 to be reset to their inactive position. Attention with respect to these particular forms of contact members is especially directed to Figs. 9 and 10 of the drawings which show more clearly the detail construction of these contact members. It should be understood that each of the contact members 52 and 53 is provided with a downwardly projecting lip 57 for the purpose of limiting the swing of the contact dogs 52 and 53 in one direction. It should be understood that as the carriage 2 moves toward the left in Fig. 3, that the finger 51 on the right hand side of the carriage in Fig. 3 will first cause the finger 55 to contact with the contact finger 55' of the contact mechanism 50, then by constantly moving toward the left in Fig. 3, this finger 51 will also cause the finger 55 of the contact device 49 to close the circuit with the finger 54. On the return of the carriage, however, the finger 51 upon the right hand side of the carriage in Fig. 3 will move toward the right in Fig. 3 and leave the finger 55 of the contact mechanism 49 in engagement with the finger 54, but as the carriage travels back toward the right, the finger 51 upon the right hand side of the carriage in Fig. 3 will engage a finger 56 of the contact mechanism 50 and throw the finger 55 of the contact mechanism 50 out of engagement with the finger 55'. The finger 51 upon the left hand side of the carriage in Fig. 3 will engage the finger 56 of the contact mechanism 49 and swing the finger 55 of this contact mechanism 49 out of engagement with the finger 54 as the carriage travels still farther to the right.

Attention is now particularly directed to the electrical connections shown in the diagrammatic view illustrated in Fig. 4 of the drawings. The usual keys 48 are employed for the purpose of actuating the type bars 58, which type bars are connected to the armatured arms 59, the armatured arms being operated by means of the actuating magnets 60. These magnets 60 are electrically connected to the keys 48 by means of the contact wires 61 and 62. Attention with respect to the particular construction of the keys shown in the present application is hereby directed to our co-pending application relating to a type bar actuating mechanism and key construction for a typewriting machine filed February 2, 1915, Serial Number 5,788. It should be understood that the electro-magnet 42 is electrically connected to the inner ends of the keys 48, or in other words to the wire 61 by means of a communicating wire 63 illustrated clearly in Fig. 4 of the drawings. This magnet 42 is also connected to a connecting wire 64 by means of a wire 65', the wire 64 being connected to the wire 62 through the battery 65 by means of the wire 66. It will, therefore, be seen that at each time one of the keys 48 is operated, the magnet 42 will be energized, thereby causing the gear 35 to rotate toward the left in Fig. 4 and in turn cause the pinion 22 to also rotate and feed the carriage 2 toward the left of the supporting frame. It will be seen that as the carriage travels toward the left in Fig. 4 the depending arm 51 upon the right hand end of the rack bar 21 will cause the upwardly extending contact member 55 of the contact member 50 to close a circuit with the contact member 55'. As the carriage continues to travel the contact finger 55 upon the contact member 49 will be thrown into contact with the contact point 54 and in this manner cause a current to pass from the battery 65 up through the contact wire 67 through the contact 55', the contact finger 55 of the contact member 50, through the wire 68, through the contact finger 55 and contact 54, through the wire 69, through the wire 70 energizing the magnet 41, through the wire 71 to the battery 65. By the energization of the magnet 41 it will be seen that the pinion 22 will be drawn out of engagement with the rack bar 21 and the carriage 2 will return to its normal position, this being accomplished by means of the tape 72 wound in the spring roller 73. As the carriage returns to this position the tripping finger 51 will strike the fingers 56 of the respective contact members 52 and 53 and return these contact members to the position shown in full lines in Fig. 4. The stop member 51 upon the left hand end of the rack bar 21 will act as a means for limiting the movement of the carriage toward the right, as this depending finger 51 or stop finger 51 will engage the upwardly extending finger 55 of the contact member 49 and in this manner limit the movement of the carriage toward the right of the machine.

During the operation of a typewriting machine it becomes necessary to return the carriage to its right hand limit before the end of the line has been reached, and for this purpose we have provided a contact key or circuit closing key 74 which has one end thereof electrically connected to the wire 70 by means of a wire 75, the wire 70 communicating with the magnet 41. A contact 76 is supported under the key 74 and is electrically connected to the wire 66 by means of a wire 77. A yoke 78 straddles the key 74 and is adapted to limit the upward movement thereof. This key 74 similar to the keys 48 is formed of spring metal to normally hold the key out of contact with the contact point 76 shown in dotted lines in Fig. 4 of the drawings.

It should be understood that when it becomes necessary to return the carriage to its right hand limit upon the frame of the typewriting machine, it would not be necessary for the operator to take his hand off of the key-board, but by pressing the key 74 the circuit will be closed from the battery 65 down through the wire 66, through the wire 77, through the key 74, through the wire 75 and the wire 70 to the magnet 41 to the wire 71 and to the battery 65, thereby drawing the pinion 22 out of engagement with the teeth formed upon the lower edge of the rack 21.

From the foregoing description it will be seen that a very simple and efficient mechanism has been produced for automatically returning a carriage of a typewriting machine to its normal position after a full line has been written. It should be understood that the usual warning bell 79 is employed upon the machine having a clapper 80 which is adapted to be engaged by any suitable mechanism carried by the carriage for sounding the desired warning at the proper time prior to the return of the carriage to its normal position.

It should be further borne in mind that the present device eliminates considerable manual labor in connection with a typewriting machine, and that the carriage is fed forwardly by means of the operation of the gear 35, plunger 43 and pinion 22, the carriage being returned by the tape 72 which is carried by the spring roller 73.

In order to relieve the carriage of considerable shock upon its return movement a shock absorber has been produced comprising a casing 81 having a valve casing 82 formed at one end thereof, within which valve casing 82 is slidably mounted a spring pressed plunger 83. This spring pressed plunger 83 carries a valve 84 which is adapted to be normally held off of its seat by means of the spring carried by the plunger 83. A depending arm 85 is carried by the carriage 2, and this arm 85 is provided with a laterally projecting finger 86 having a head 87 carried by one end thereof.

This head 87 is adapted to fit within the casing 81, and upon the sudden entrance of the head 87 into the casing 81, the valve 84 will be closed upon its seat and produce an air cushion for the head 87. After the first shock, however, the valve 84 will be opened and the air will be allowed to gradually escape from the casing 81 and permit the carriage to return to its full normal position.

Of course, it should be understood that any changes in the detail mechanical construction may be employed in the present device, so long as the changes fall within the scope of the appended claims, without departing from the spirit of the invention.
Having thus described the invention what is claimed as new, is:—

1. A typewriting machine of the class described comprising a frame, a carriage slidably mounted upon said frame, a rack supported upon said carriage, a pinion meshing with said rack, a plunger rod supporting said pinion, an operating gear coöperating with said pinion for rotating the same and feeding said carriage in one direction, a plunger rod coöperating with said gear and adapted to reciprocate for rotating said gear at a predetermined distance at each reciprocation of said plunger, a shaft supporting said gear, a link connected to said supporting shaft and engaging said first mentioned plunger rod and constituting a bearing for said pinion, a spring pressed dog engaging said gear for permitting the rotation of said gear in one direction, brackets supporting said plungers, a spring carried by each plunger for urging said plungers upwardly, and electro-magnetic means for operating said plungers.

2. A typewriting machine of the class described comprising a frame, a carriage slidably mounted upon said frame, a rack carried by said carriage, a feeding pinion meshing with said rack, an auxiliary pinion coöperating with said feeding pinion, an actuating gear meshing with said auxiliary pinion, a shaft supporting said actuating gear, a link connected to said shaft and constituting a bearing for said feeding pinion and said auxiliary pinion, a vertically movable plunger engaging the upper end of said link and adapted to throw said feeding pinion into and out of engagement with said rack, spring means for normally urging said plunger upwardly whereby said feeding pinion will be normally held in engagement with said rack, means for preventing the rotation of said feeding gear in one direction, and a reciprocating plunger engaging said actuating gear for positively rotating said actuating gear in one direction.

3. A typewriting machine of the class described comprising a frame, a carriage mounted thereon, an actuating gear, movable means normally engaging said gear and interposed between said actuating gear and said carriage and capable of engaging said carriage, means for rotating said actuating gear, and means for throwing said movable means into engagement with said carriage for moving said carriage as said actuating gear is operated.

In testimony whereof we hereunto affix our signatures in presence of two witnesses.

ELMER B. WILBUR.
CHARLES B. WILBUR.

Witnesses:
A. W. MURPHY,
F. M. SCHNEIDER.